United States Patent
Wang et al.

(10) Patent No.: US 8,731,545 B2
(45) Date of Patent: May 20, 2014

(54) METHOD, APPARATUS, AND SYSTEM FOR IMPLEMENTING SERVICE ROAMING

(75) Inventors: Huan Wang, Shenzhen (CN); Yan Li, Shenzhen (CN); Qifeng Ma, Shenzhen (CN); Xiaomin Shi, Shenzhen (CN); Heng Chang, Shenzhen (CN); Shan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 552 days.

(21) Appl. No.: 13/173,580

(22) Filed: Jun. 30, 2011

(65) Prior Publication Data
US 2011/0268039 A1    Nov. 3, 2011

Related U.S. Application Data

(63) Continuation of application No. PCT/CN2009/074623, filed on Oct. 26, 2009.

(30) Foreign Application Priority Data

Dec. 31, 2008   (CN) .......................... 2008 1 0242212

(51) Int. Cl.
*H04W 4/00*    (2009.01)

(52) U.S. Cl.
USPC .................. 455/432.1; 455/435.1; 455/432.3; 370/331

(58) Field of Classification Search
None
See application file for complete search history.

(56) References Cited

U.S. PATENT DOCUMENTS

| | | | |
|---|---|---|---|
| 7,079,499 B1 * | 7/2006 | Akhtar et al. | 370/310 |
| 7,310,659 B1 | 12/2007 | George | |
| 7,334,043 B2 | 2/2008 | Daigle et al. | |
| 2004/0078424 A1 | 4/2004 | Yairi et al. | |
| 2004/0242229 A1 | 12/2004 | Okazaki | |
| 2004/0260820 A1 | 12/2004 | Bearman | |
| 2006/0262752 A1 * | 11/2006 | Moore et al. | 370/331 |
| 2007/0143434 A1 | 6/2007 | Daigle | |
| 2007/0184833 A1 | 8/2007 | Xu et al. | |

(Continued)

FOREIGN PATENT DOCUMENTS

| | | |
|---|---|---|
| CN | 1558693 A | 12/2004 |
| CN | 1708167 A | 12/2005 |

(Continued)

OTHER PUBLICATIONS

Extended European Search Report issued in corresponding European Patent Application No. 09835998.7, mailed Mar. 5, 2012.

(Continued)

*Primary Examiner* — Erika A Washington
(74) *Attorney, Agent, or Firm* — Brinks Gilson & Lione (57) ABSTRACT

The present invention discloses a method for implementing service roaming. The method includes: receiving a roaming registration request that includes a service identifier (ID); obtaining a physical access address of a service according to the service ID, and generating and storing service registration route information that includes the service ID and the physical access address of the service; obtaining an address of a home service router or a service router to which the service belongs before the service roams, and sending a roaming notification message to the home service router or the service router to which the service belongs before the service roams. In this way, a user may access the service, thus the user experience and the universality of services created by the user are improved.

14 Claims, 6 Drawing Sheets

Send a roaming registration request that includes a service ID to the service router to which the service belongs after the service roams, so that the service router to which the service belongs after the service roams generates and stores service registration route information that includes the service ID and the physical access address of the service and that the home service router or the service router to which the service belongs before the service roams updates the service roaming route information ⟋ S301

(56) References Cited

U.S. PATENT DOCUMENTS

| | | |
|---|---|---|
| 2008/0057952 A1 | 3/2008 | Rhim |
| 2008/0074635 A1 | 3/2008 | Kimura |
| 2009/0005035 A1 | 1/2009 | Hu et al. |

FOREIGN PATENT DOCUMENTS

| | | |
|---|---|---|
| CN | 1968512 A | 5/2007 |
| CN | 101014198 A | 8/2007 |
| CN | 101094500 A | 12/2007 |
| CN | 101193026 A | 6/2008 |
| WO | WO 03/107705 A1 | 12/2003 |
| WO | WO 2007/122576 A1 | 11/2007 |

OTHER PUBLICATIONS

Written Opinion of the International Searching Authority issued in corresponding PCT Patent Application No. PCT/CN2009/074623, mailed Feb. 4, 2010.

International Search Report issued in corresponding PCT Patent Application No. PCT/CN2009/074623, mailed Feb. 4, 2010.

NGSON Working Group, "Draft Architecture Document for Next Generation Service Overlay Network" IEEE P1903/D1, May 2008.

Chinese Patent No. 101771995, issued on Feb. 27, 2013, granted in corresponding Chinese Patent Application No. 200810242212.5.

\* cited by examiner

METHOD, APPARATUS, AND SYSTEM FOR IMPLEMENTING SERVICE ROAMING

CROSS-REFERENCE TO RELATED APPLICATIONS

This application is a continuation of International Application No. PCT/CN2009/074623, filed on Oct. 26, 2009, which claims priority to Chinese Patent Application No. 200810242212.5, filed on Dec. 31, 2008, both of which are hereby incorporated by reference in their entireties.

FIELD OF THE INVENTION

The present invention relates to the communication field, and in particular, to a method, an apparatus, and a system for implementing service roaming.

BACKGROUND OF THE INVENTION

With the convergence of the Internet and telecom networks and the popularity of mobile broadband services, telecom operators are in urgent need of more services to diversify their services. Because the Web 2.0 concept and Mashup service are popular, a large quantity of services created by users occurs on the Internet. Telecom operators also hope to enrich their telecom network services based on this service creation mode. However, most of the services created by the users may be deployed on the devices of the users (for example, a personal computer, a portable computer, and a mobile phone), rather than on the network devices of the operators, which may cause the change of the physical access addresses or logical access addresses of the services.

During the implementation of the present invention, the inventor discovers the following problems in the prior art: When the home network management domain of a service changes, other users are unable to access the service. Thus, the user experience is affected, and the universality of the created services is limited.

SUMMARY OF THE INVENTION

Embodiments of the present invention provide a method, an apparatus, and a system for implementing service roaming to overcome the problem that the service roaming may not be implemented in the prior art.

A method for implementing service roaming includes:

receiving a roaming registration request that includes a service identifier (ID);

obtaining a physical access address of a service according to the service ID, and generating and storing service registration route information that includes the service ID and the physical access address of the service; and obtaining the address of a home service router or a service router to which the service belongs before the service roams, and sending a roaming notification message to the home service router or the service router to which the service belongs before the service roams, so that the home service router or the service router to which the service belongs before the service roams updates the service roaming route information.

A method for implementing service roaming includes:

receiving a roaming notification message from a service router to which a service belongs after the service roams, where the roaming notification message includes a service ID and the address of the service router to which the service belongs after the service roams; and updating the service roaming route information according to the roaming notification message, where the updated service roaming route information includes the service ID and the address of the service router to which the service belongs after the service roams.

A service router includes:

a roaming registration request receiving unit, configured to receive a roaming registration request that includes a service ID;

a service registration route information generating unit, configured to: obtain a physical access address of a service according to the service ID, and generate and store service registration route information that includes the service ID and the physical access address of the service; and a roaming notification message sending unit, configured to: obtain the address of a home service router or a service router to which the service belongs before the service roams, and send a roaming notification message to the home service router or the service router to which the service belongs before the service roams, so that the home service router or the service router to which the service belongs before the service roams updates the service roaming route information.

A system for implementing service roaming includes a service router and an information storage server.

The service router is configured to: receive a roaming registration request that includes a service ID; obtain a physical access address of a service according to the service ID, and generate and store service registration route information that includes the service ID and the physical access address of the service; obtain the address of a home service router or a service router to which the service belongs before the service roams, and send a roaming notification message to the home service router or the service router to which the service belongs before the service roams, so that the home service router or the service router to which the service belongs before the service roams updates the service roaming route information.

The information storage server is configured to store the service registration route information that includes the service ID and the physical access address of the service.

In the preceding embodiments of the present invention, a roaming registration request is received from the service; the registration route information and the service roaming route information are updated according to the roaming registration request. In this way, the service roaming is successfully implemented, and a user may access the service, thus the user experience and the universality of services created by the user are improved.

BRIEF DESCRIPTION OF THE DRAWINGS

Accompanying drawings are provided herein to help further understand the present invention and constitute part of the application without limiting the present invention. In the accompanying drawings.

DETAILED DESCRIPTION OF THE EMBODIMENTS

For better understanding of the objective, technical solution, and merit of the present invention, the present invention is described in detail with reference to the exemplary embodiments and accompanying drawings. Here, the exemplary embodiments of the invention and related descriptions are for explanation of the present invention without limiting the present invention.

Figure 1:
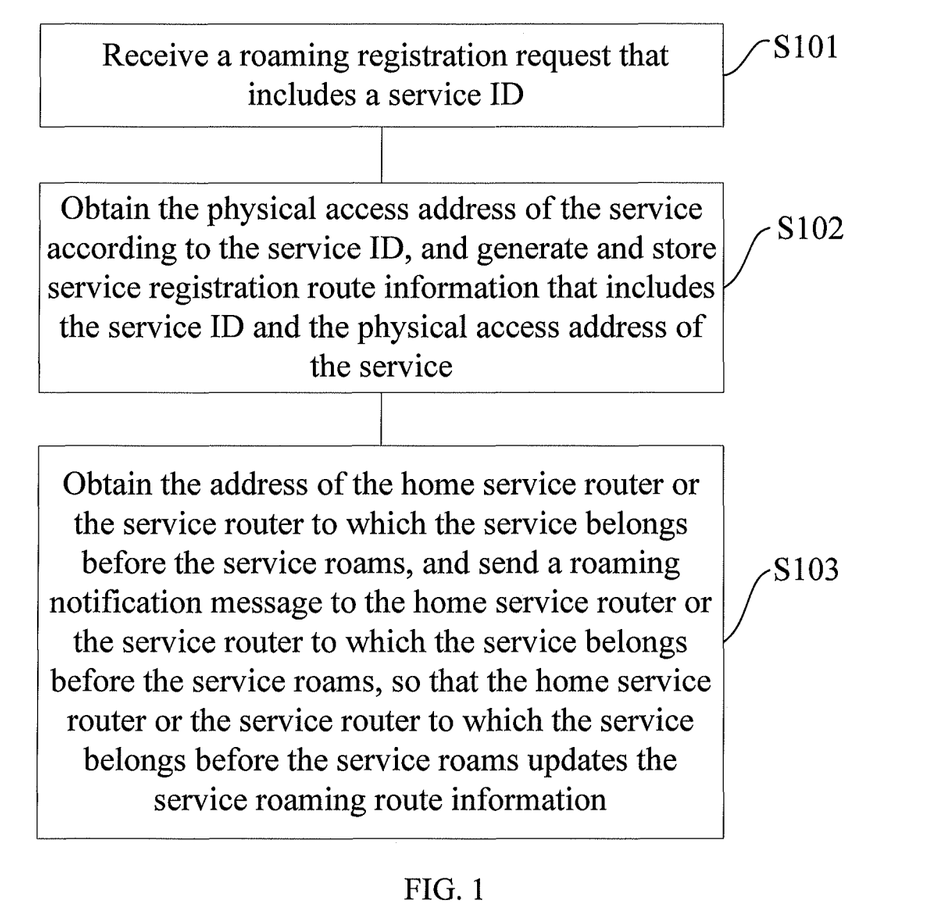
FIG. 1 is a flowchart of a method for implementing service roaming according to an embodiment of the present invention.

As shown in FIG. 1, an embodiment of the present invention provides a method for implementing service roaming, including the following steps:

S101: Receive a roaming registration request that includes a service ID.

S102: Obtain the physical access address of a service according to the service ID, and generate and store service registration route information that includes the service ID and the physical access address of the service.

S103: Obtain the address of a home service router or a service router to which the service belongs before the service roams, send a roaming notification message to the home service router or the service router to which the service belongs before the service roams, so that the home service router or the service router to which the service belongs before the service roams updates the service roaming route information.

In this embodiment, the service registration route information that includes the service ID and the physical access address of the service may be stored on the service router or the service registration server or in a service directory according to the actual need.

In the preceding embodiment of the present invention, a roaming registration request is received from the service; the registration route information and the service roaming route information are updated according to the roaming registration request. In this way, the service roaming is successfully implemented, and a user may access the service, thus the user experience and the universality of services created by the user are improved.

Figure 2:
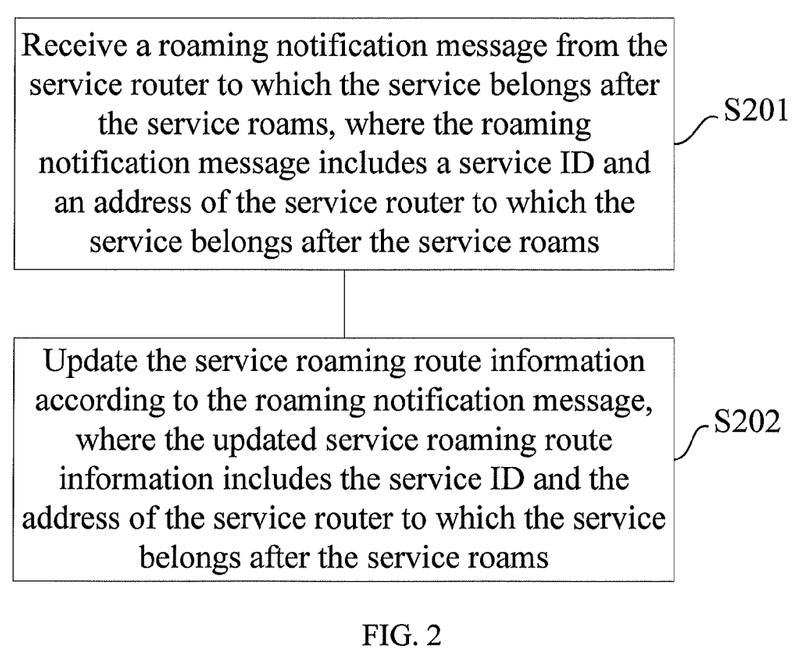
FIG. 2 is a flowchart of another method for implementing service roaming according to an embodiment of the present invention.

As shown in FIG. 2, an embodiment of the present invention provides another method for implementing service roaming, including the following steps:

S201: Receive a roaming notification message from a service router to which the service belongs after the service roams, where the roaming notification message includes a service ID and an address of the service router to which the service belongs after the service roams.

S202: Update the service roaming route information according to the roaming notification message, where the updated service roaming route information includes the service ID and the address of the service router to which the service belongs after the service roams.

Figure 3:
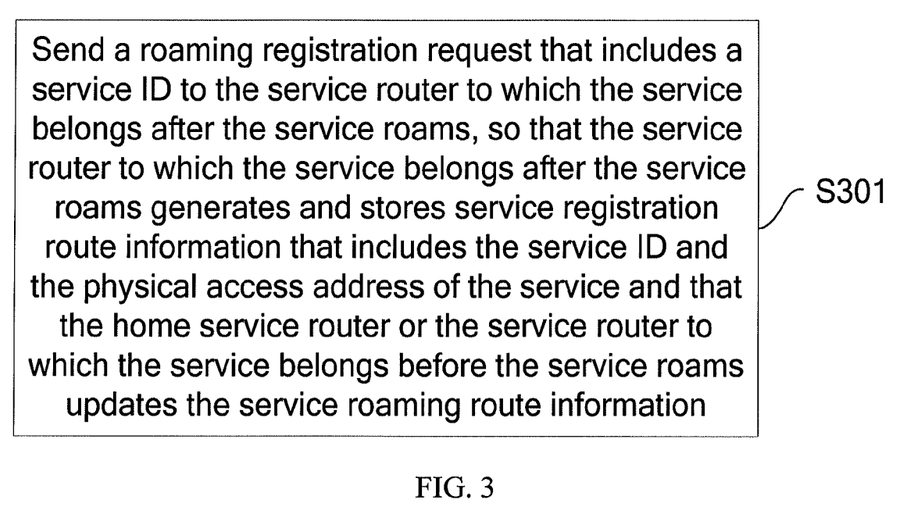
FIG. 3 is a flowchart of another method for implementing service roaming according to an embodiment of the present invention.

As shown in FIG. 3, an embodiment of the present invention provides another method for implementing service roaming, including the following steps:

S301: Send a roaming registration request that includes a service ID to a service router to which the service belongs after the service roams, so that the service router to which the service belongs after the service roams generates and stores service registration route information that includes the service ID and the physical access address of the service and that a home service router or a service router to which the service belongs before the service roams updates the service roaming route information.

In the preceding embodiment of the present invention, a roaming registration request is received from the service; the registration route information and the service roaming route information are updated according to the roaming registration request. In this way, the service roaming is successfully implemented, and a user may access the service, and thus the user experience and the universality of services created by the user are improved.

Figure 4:
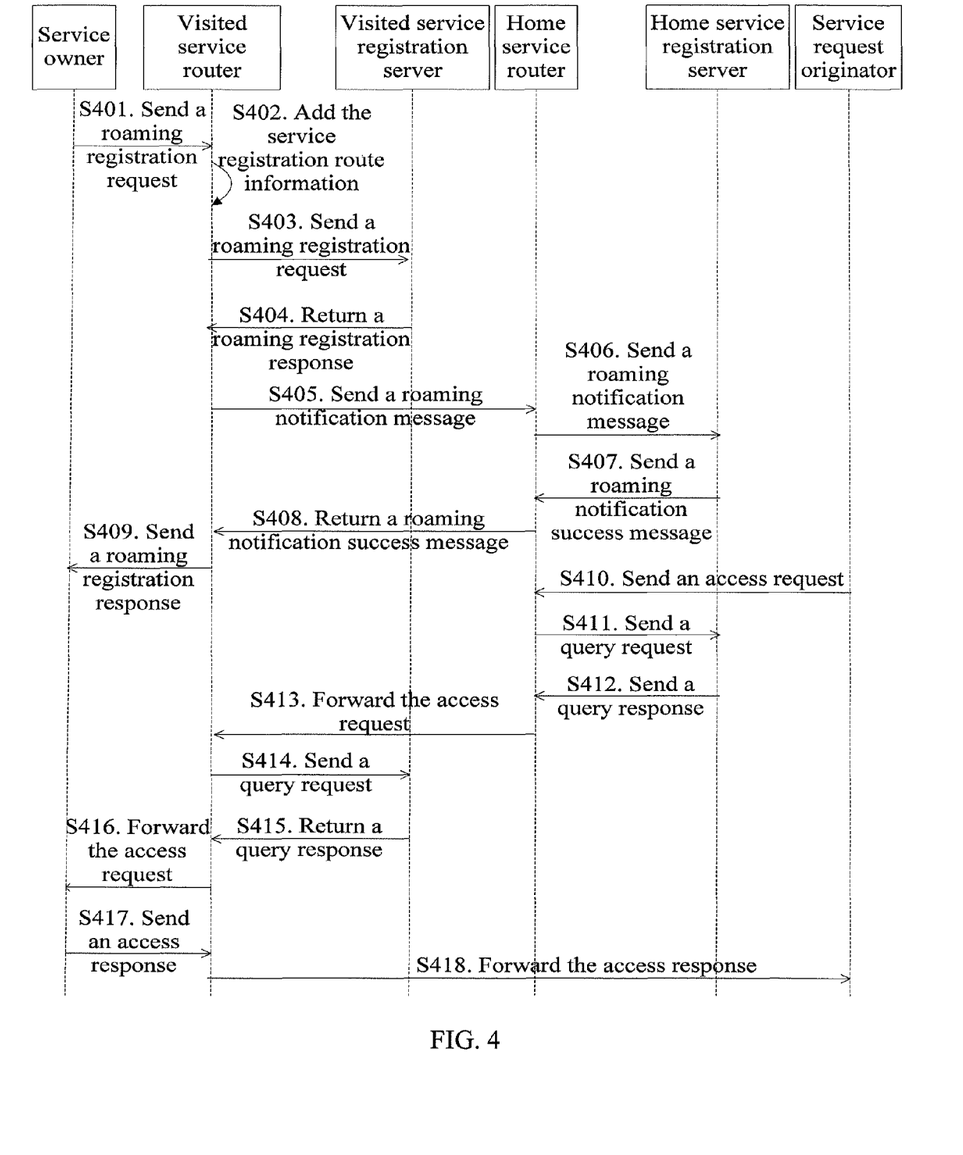
FIG. 4 is a flowchart of another method for implementing service roaming according to an embodiment of the present invention.

As shown in FIG. 4, an embodiment of the present invention provides a method for implementing service roaming. There may be a scenario where a service is deployed on a mobile device, for example, a virtual tour service is deployed on a portable computer of the service creator; when the network management domain of the service changes, and the physical access network of the service changes, the service requires roaming registration to ensure that other users may access the service successfully. This method involves a visited service router, a visited service registration server, a home service router, a home service registration server, a service request originator, and a service owner. The visited service router is a service router to which the service belongs after the service roams. The visited service registration server is a service registration server corresponding to the visited service router. The home service router is a service router to which the service belongs before the service roams. The home service registration server is a service registration server corresponding to the home service router. The method includes the following steps:

S401: When the service roams, the service sends a roaming registration request to the visited service router, where the roaming registration request may carry information such as a service ID, a service roaming state, and a service access state. The service ID may be a service name or a logical address of the service. The logical address of the service may be a uniform resource locator (URL) of the service. The service roaming state information includes a roaming state ID of the service or a non-roaming state ID of the service. The service access state information includes a service disabling state ID or a service running state ID. The roaming registration request may further include the address of the home service router.

Before sending the roaming registration request, the service may also send a service access state update message to the home service router to change the service access state to a disabling state. The purpose is to ensure that the access request reaching the home service router may be stored by the home service router before the service roaming registration succeeds. After the service roams successfully, the access request is re-processed.

S402: After receiving the roaming registration request, the visited service router obtains the physical access address of the roaming service according to the service ID, and adds the service registration route information that includes the service ID and the physical access address of the roaming service to the routing table, where the physical access address of the service is the IP access address of the roaming service.

The visited service router may also obtain and store the address of the home service router. The visited service router may obtain the address of the home service router in multiple modes. For example, the visited service router may query the service directory for the address of the home service router according to the service ID; or the visited service router may obtain the address of the home service router directly from the roaming registration request, and in this case, the roaming registration request includes the address of the home service router of the service.

Before adding the registration route information of the roaming service to the routing table, the visited service router may also perform necessary authentication on the roaming registration request. For example, the visited service router sends an authentication request to the service owner; the service owner sends a service authentication command to the visited service router according to the authentication request; the visited service router obtains service authentication information from the service directory or the authentication center according to the service authentication command; the visited service router authenticates the service according to the service authentication information.

If the service authentication succeeds, the visited service router performs roaming registration for the service; if the service authentication fails, the visited service router stops the roaming registration for the service.

S403: After adding the registration route information of the roaming service and obtaining the address of the home service router, the visited service router sends a roaming registration request to the visited service registration server corresponding to the visited service router, where the roaming registration request may include information such as the service ID, service roaming state, service access state, address of the home service router, and address of the visited service router.

S404: After receiving the roaming registration request, the visited service registration server processes the roaming registration request, stores the information of the roaming service such as the service ID, service roaming state, service access state, and address of the home service router, and returns a roaming registration response to the visited service router.

S405: After receiving the roaming registration response, the visited service router sends a roaming notification message to the home service router of the service, where the roaming notification message may include information such as the service ID, service roaming state, and address of the visited service router.

S406: After receiving the roaming notification message, the home service router updates the service roaming route information, deletes the information of original route entries of the service, adds the address of the visited service router to the service roaming route information, and sends a roaming notification message that includes the service ID and the service roaming state to the home service registration server.

S407: After receiving the roaming notification message, the home service registration server updates the service roaming state, changes the service roaming state from the non-roaming state to the roaming state, stores the address of the visited service router of the service, and sends a roaming notification success message to the home service router.

S408: After receiving the roaming notification success message, the home service router sends a service roaming notification success message to the visited service router.

S409: After receiving the roaming notification message, the visited service router sends a roaming registration response to the service.

If an access request originator sends an access request to the home service router during the roaming registration of the service, the home service router buffers the access request; after the home service router receives a roaming notification success message from the home service registration server, the home service router sends the access request to the visited service router.

After receiving the roaming registration response, the service owner sends a service access state update message to the visited service router; after receiving the service access state update message, the visited service router forwards the service access state update message to the visited service registration server; the visited service registration server changes the access state of the service from a disabling state to a running state according to the service access state update message.

In this way, the roaming registration of the service succeeds, and other users may access the service. If an access request originator sends an access request to the service owner at this time, the process may be implemented in the following steps:

S410: The access request originator sends an access request to the home service router of the service owner before the service owner roams, where the access request includes the address of the service request originator and the service ID of the accessed service.

S411: After receiving the access request, the home service router sends a query request that includes a service ID to the home service registration server.

S412: The home service registration server obtains the service roaming state of the service according to the service ID, and sends a query response that includes the roaming state information of the service to the home service router.

S413: After receiving the query response from the home service registration server, the home service router queries for the address of the visited service router to which the service belongs, and forwards the access request to the visited service router according to the address of the visited service router.

S414: After receiving the access request, the visited service router sends a query request that may include a service ID to the visited service registration server.

S415: The visited service registration server obtains the service access state according to the service ID, and returns a query response that includes the access state information of the service to the visited service router.

S416: After receiving the preceding query response, the visited service router obtains the physical access address of the roaming service if the service access state is a running state. For example, the visited service router queries the routing table of the visited service router for the physical access address of the service, and forwards the access request to the service according to the physical access address of the service.

If the service access state is a disabling state, the visited service router sends an access failure response to the home service router, so that the home service router returns an access failure response to the service request originator.

S417: After receiving the access request, the service owner processes the service request, and sends an access response to the visited service router.

S418: The visited service router forwards the access response to the service request originator.

In this embodiment of the present invention, when the network management domain of the service changes, that is, when the service roams, the service owner may send a roaming registration request to the visited service router; the visited service router and the visited service registration server register the service, and notify the home service router of the fact that the service has already roamed; the home service router updates the service roaming route information, and the home service registration server updates the service roaming state. In this way, the service roaming is implemented successfully, and the user may access the service, thus the user experience and the universality of the services created by the user are improved.

In another method for implementing service roaming according to an embodiment of the present invention, the service ID, the service access state, the service registration route information, and the address of the home service router are all stored on the visited service registration server, while the visited service router is only responsible for forwarding messages. The detailed process is similar to that described in the embodiment shown in FIG. 4.

Figure 5:
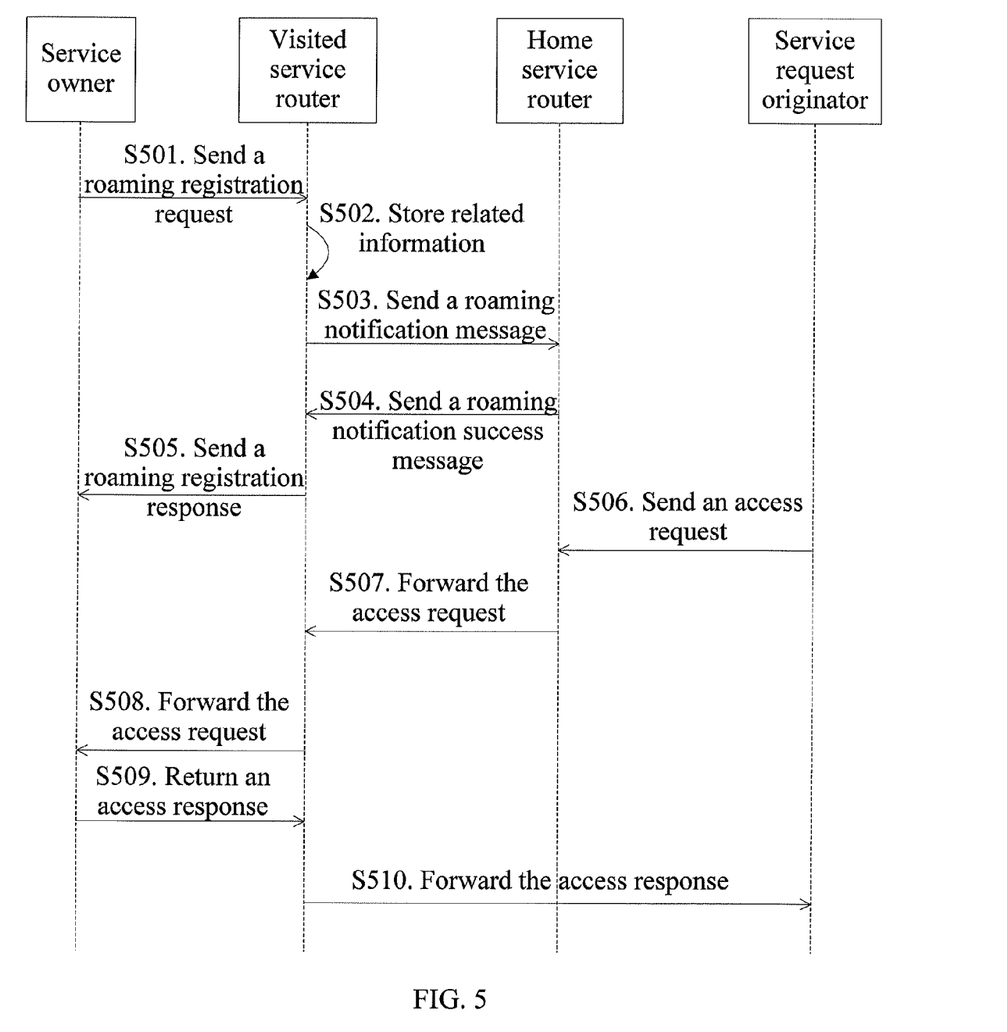
FIG. 5 is a flowchart of another method for implementing service roaming according to an embodiment of the present invention.

FIG. 5 is a flowchart of another method for implementing service roaming according to an embodiment of the present invention. The embodiment shown in FIG. 5 differs from the embodiment shown in FIG. 4 in that: The service router integrates the function of the service registration server, and only the service router processes the service registration. The method includes the following steps:

S501 is the same as S401, and is not further described here.

S502: After receiving a roaming registration request, the visited service router stores related information such as the service ID, service roaming state, and service access state, obtains the physical access address of the roaming service according to the service ID, and adds the registration route information of the roaming service to the routing table, where the registration route information of the roaming service includes the service ID and the physical access address of the roaming service, and the physical access address of the service may be an IP access address of the roaming service.

The visited service router may also obtain and store the address of the home service router. The visited service router may obtain the address of the home service router in multiple modes. For example, the visited service router may query the service directory for the address of the home service router of the service according to the service ID; or the visited service router may obtain the address of the home service router directly from the roaming registration request, and in this case, the roaming registration request includes the address of the home service router of the service.

Before adding the registration route information of the roaming service to the routing table, the visited service router may also perform necessary authentication on the roaming registration request. For example, the visited service router sends an authentication request to the service owner; the service owner sends a service authentication command to the visited service router according to the authentication request; the visited service router obtains service authentication information from the service directory or the authentication center according to the service authentication command; the visited service router authenticates the service according to the service authentication information.

If the service authentication succeeds, the visited service router performs roaming registration for the service; if the service authentication fails, the visited service router stops the roaming registration for the service.

S503: After adding the registration route information of the roaming service and obtaining the address of the home service router, the visited service router sends a roaming notification message to the home service router of the service, where the roaming notification message may include information such as the service ID, service roaming state, and address of the visited service router.

S504: After receiving the roaming notification message, the home service router processes the roaming notification message as follows: Update the service roaming route information; delete the information of the original route entries of the service, and add the address of the visited service router to the route information; store the information such as the service ID, service roaming state, and address of the visited service router; and send a roaming notification success message to the visited service router.

S505: After receiving the roaming notification message, the visited service router sends a roaming registration response to the service.

If an access request originator sends an access request to the home service router during the roaming registration of the service, the home service router buffers the access request; when the home service router sends a roaming notification success message to the visited service server, the home service router sends the access request to the visited service router.

After receiving the roaming registration response, the service sends a service access state update message to the visited service router; the visited service router changes the access state of the service from a disabling state to a running state.

In this way, the roaming registration of the service succeeds, and other users may access the service. If an access request originator sends an access request to the service at this time, the process may be implemented in the following steps:

S506: The access request originator sends an access request that includes the address of the service request originator and the service ID of the accessed service to the service, where the access request is firstly sent to the home service router.

S507: After receiving the access request, the home service router queries for the roaming state of the service. If knowing that the service has already roamed, the home service router queries for the address of the visited service router of the service, and forwards the access request to the visited service router according to the address of the visited service router.

S508: After receiving the access request, the visited service router queries for the service access state according to the service ID; if the service access state is a running state, the visited service router obtains the physical access address of the roaming service, and forwards the access request to the service according to the physical access address of the service.

If the service access state is a disabling state, the visited service router sends an access failure response to the home service router, so that the home service router returns an access failure response to the service request originator.

S509: After receiving the access request, the service processes the service request, and sends an access response to the visited service router.

S510: The visited service router forwards the access response to the service request originator.

In this embodiment of the present invention, when the network management domain of the service changes, that is, when the service roams, the service may send a roaming registration request to the visited service router; the visited service router registers the service, and notifies the home service router of the fact that the service has already roamed; the home service router updates the service roaming route information and the roaming state of the service. In this way, the service roaming is implemented successfully, and the user may access the service, thus the user experience and the universality of the services created by the user are improved.

Figure 6:
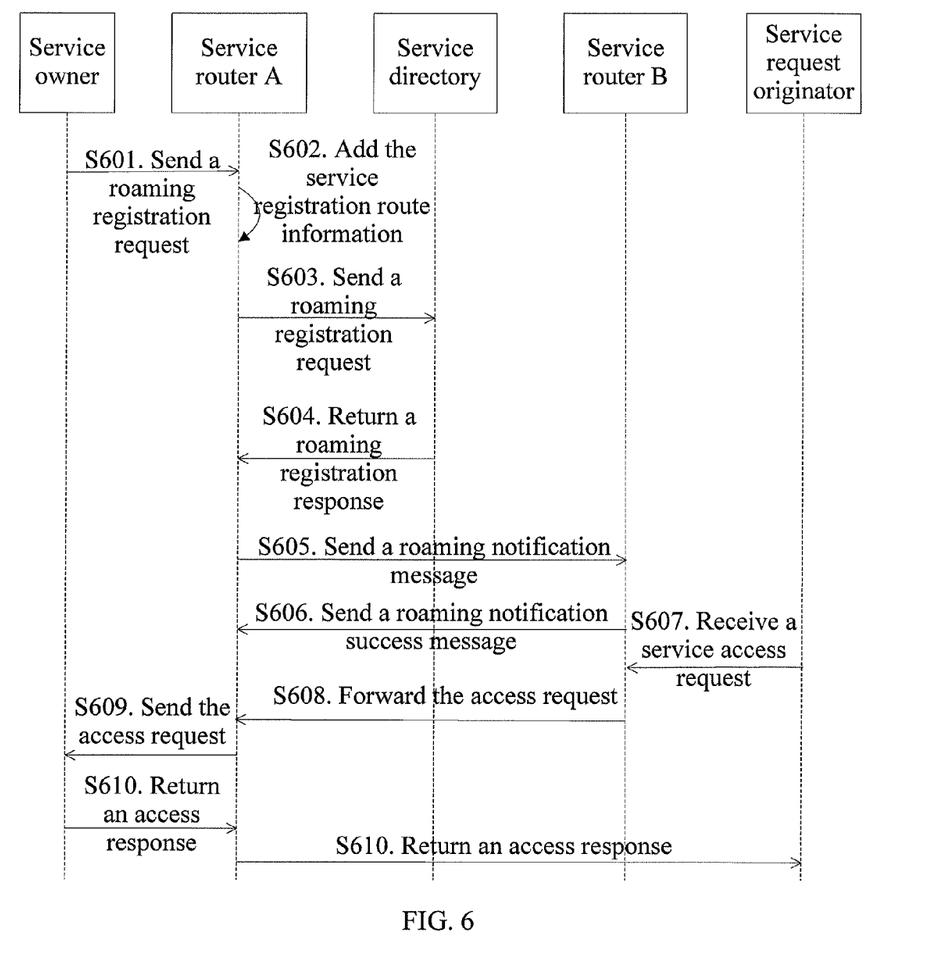
FIG. 6 is a flowchart of another method for implementing service roaming according to an embodiment of the present invention.

FIG. 6 is a flowchart of another method for implementing service roaming according to an embodiment of the present invention. The embodiment shown in FIG. 6 differs from the embodiment shown in FIG. 4 in that: The functions of the visited service registration server and the home service registration server are integrated into the service directory. Suppose that the service belongs to service router B before roaming and the service belongs to service router A after roaming. In this case, after a service request originator sends an access request to the home service router of the service request originator, the service router may query the service directory for the home service router of the service, and then forward the access request to the home service router of the service. The method includes the following steps:

S601: When the service roams, the service sends a roaming registration request to service router A, where the roaming registration request may carry information such as the service ID, service roaming state, and service access state. The service ID may be a service name or a service code or a logical address of the service. The logical address of the service may be the URL of the service. The roaming registration request may also include the address of the service router to which the service belongs before the service roams. The roaming state information of the service includes a roaming state ID of the service or a non-roaming state ID of the service. The service access state information includes a disabling state ID of the service or a running state ID of the service. The roaming registration request may further include the address of the home service router.

Before sending the roaming registration request, the service may also send a service access state update message to service router B to change the service access state to a disabling state. The purpose is to ensure that the access request reaching service router B may be stored by service router B before the service roaming registration succeeds. After the service roams successfully, the access request is re-processed.

S602: After receiving the roaming registration request, service router A obtains the physical access address of the roaming service according to the service ID, and adds the registration route information of the roaming service to the routing table, where the registration route information of the roaming service includes the service ID and the physical access address of the roaming service, and the physical access address of the roaming service is the IP access address of the roaming service.

Before adding the registration route information of the roaming service to the routing table, service router A may also perform necessary authentication on the roaming registration request. For example, service router A sends an authentication request to the service; the service sends a service authentication command to service router A according to the authentication request; service router A obtains service authentication information from the service directory or the authentication center according to the service authentication command; service router A authenticates the service according to the service authentication information. If the service authentication succeeds, service router A performs roaming registration for the service; if the service authentication fails, service router A rejects the roaming registration for the service.

S603: After completing the roaming registration for the service, service router A obtains and stores the address of service router B. Service router A obtains the address of service router B in multiple modes. For example, service router A may query the service directory for the address of service router B to which the service belongs before the service roams according to the service ID; or service router A may obtain the address of service router B directly from the roaming registration request, and in this case, the roaming registration request includes the address of service router B to which the service belongs before the service roams. In addition, service router A sends a roaming registration request to the service directory, where the roaming registration request may include information such as the service ID, service roaming state, service access state, address of service router B, and address of service router A.

S604: After receiving the roaming registration request, the service directory stores and updates the registration storage and user access information of the service, where the registration storage may include information such as the service ID, service roaming state, service access state, and address of service router A to which the service belongs currently. In addition, the service directory returns a roaming registration response to service router A. The user access information includes the service ID and the address of service router A to which the service belongs currently.

S605: After receiving the roaming registration response returned from the service directory, service router A sends a roaming notification message to service router B according to the address of service router B, where the roaming notification message includes information such as the service ID, address of service router A, and service roaming state.

S606: After receiving the roaming notification message, service router B updates the service roaming route information, deletes the information of the original route entries of the service, and buffers the address of service router A in the service roaming route information, so that subsequent access requests are directly forwarded to service router A, and sends a roaming notification success message to service router A.

If the service roams when a service request originator accesses the service, the service request originator may not obtain the updated access information of the service directory. Therefore, some access requests may still be sent to service router B, and service router B still needs to maintain the service roaming route information for a certain period of time and forward the received access requests to service router A. Service router B deletes the address of service router A after the set time expires to reduce the load of service router B. In this case, the process proceeds to S607 to S611.

S607: Service router B receives an access request from the access request originator, where the access request includes the address of the access request originator and the service ID of the accessed service.

S608: Service router B obtains the address of service router A according to the service ID, and forwards the access request to service router A.

S609: Service router A receives the access request, obtains the information such as roaming state information and access state information of the service from the service directory according to the service ID, and sends an access request to the service according to the roaming state information, access state information, and physical access address of the service.

S610: After receiving the access request, the service processes the service request, and returns an access response to service router A.

S611: After receiving the access response, the visited router sends an access response to the access request originator.

In this embodiment, when the network management domain of the service changes, that is, when the service roams, the service may send a roaming registration request to a service router to which the service belongs currently; the service router to which the service belongs currently and the service directory register the service, and notify a service router to which the service belongs after the service roams of the fact that the service has already roamed; the service router to which the service belongs after the service roams updates the service roaming route information. In this way, the service roaming registration is implemented, and other users may access the service, thus the user experience is improved. In addition, in this embodiment, the function of the service registration server is integrated into the service directory, so that the service directory controls the service exchange, service roaming registration, and route query, which facilitates operators in controlling the service operation.

Figure 7:
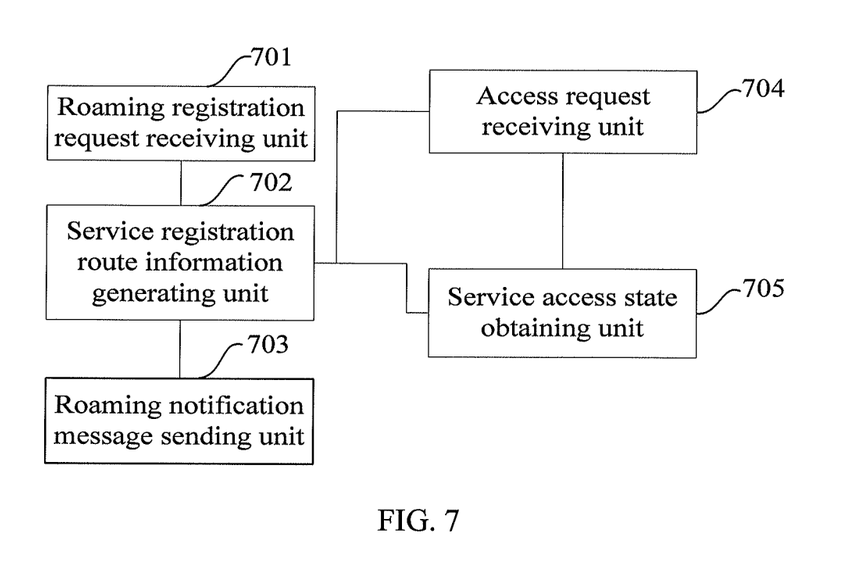
FIG. 7 is a schematic structural diagram of a service router according to an embodiment of the present invention.

As shown in FIG. 7, an embodiment of the present invention provides a service router, including:

a roaming registration request receiving unit 701, configured to receive a roaming registration request that includes a service ID;

a service registration route information generating unit 702, configured to: obtain the physical access address of the service according to the service ID, and generate and store service registration route information that includes the service ID and the physical access address of the service; and a roaming notification message sending unit 703, configured to: obtain the address of the home service router or the service router to which the service belongs before the service roams, and send a roaming notification message to the home service router or the service router to which the service belongs before the service roams, so that the home service router or the service router to which the service belongs before the service roams updates the service roaming route information.

Further, the preceding roaming notification message sending unit 703 is configured to query the service directory for the address of the home service router or the service router to which the service belongs before the service roams according to the service ID in the roaming registration request, or obtain the address of the home service router or the service router to which the service belongs before the service roams from the roaming registration request that includes the address of the home service router or the service router to which the service belongs before the service roams.

Further, the preceding service router includes an access request receiving unit 704, configured to: receive an access request that includes the service ID; obtain the physical access address of the service according to the service ID and the service registration route information; and send the access request to the service according to the physical access address of the service.

Further, the preceding service router includes a service access state obtaining unit 705, configured to: obtain the stored service access state, judge that the service access state is a running state, and send the access request to the service.

Figure 8:
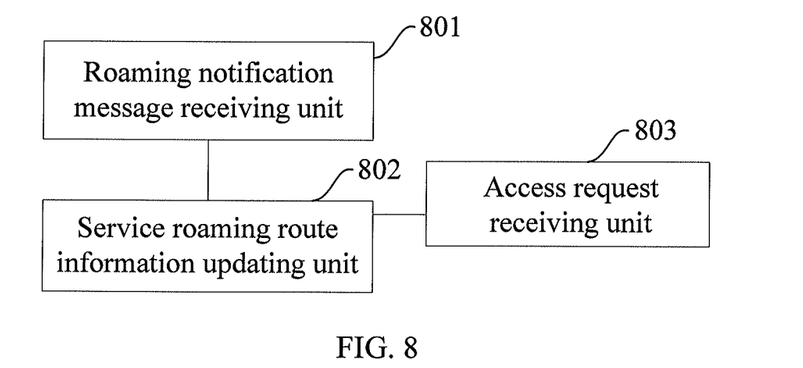
FIG. 8 is a schematic structural diagram of another service router according to an embodiment of the present invention.

As shown in FIG. 8, an embodiment of the present invention provides another service router, including a roaming notification message receiving unit 801 and a service roaming route information updating unit 802. The roaming notification message receiving unit 801 is configured to receive a roaming notification message from a service router to which the service belongs after the service roams, where the roaming notification message includes a service ID and the address of the service router to which the service belongs after the service roams. The service roaming route information updating unit 802 is configured to update the service roaming route information according to the roaming notification message, where the updated service roaming route information includes the service ID and the address of the service router to which the service belongs after the service roams.

Further, the preceding service router includes an access request receiving unit 803, configured to: receive an access request that includes a service ID, obtain the address of a service router to which the service belongs after the service roams according to the service ID and the service roaming route information, and send the access request to the service router to which the service belongs after the service roams.

An embodiment of the present invention provides a service providing terminal, including a roaming registration request sending unit, configured to send a roaming registration request that includes a service ID to a service router to which the service belongs after the service roams, so that the service router to which the service belongs after the service roams generates and stores service registration route information that includes the service ID and the physical access address of the service and that the home service router or a service router to which the service belongs before the service roams updates the service roaming route information.

Figure 9:
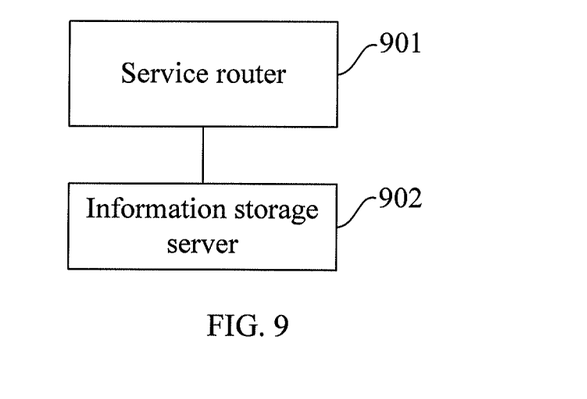
FIG. 9 is a schematic structural diagram of a system for implementing service roaming according to an embodiment of the present invention.

As shown in FIG. 9, an embodiment of the present invention provides a system for implementing service roaming, including a service router 901 and an information storage server 902.

The service router 901 is configured to: receive a roaming registration request that includes a service ID; obtain a physical access address of the service according to the service ID, and generate and store service registration route information that includes the service ID and the physical access address of the service; obtain the address of a home service router or a service router to which the service belongs before the service roams, and send a roaming notification message to the home service router or the service router to which the service belongs before the service roams, so that the home service router or the service router to which the service belongs before the service roams updates the service roaming route information.

The information storage server 902 is configured to store service registration route information that includes the service ID and the physical access address of the service.

It is understandable to those skilled in the art that the present invention may be implemented through software in addition to a necessary universal hardware platform or through hardware only. In most circumstances, the former is preferred. Therefore, the essence of the technical solution under the present invention or the contributions to the prior art may be embodied as a software product. The software product is stored in a storage medium, and includes several instructions that enable a mobile device (mobile phone, personal computer, or media player) to perform the methods provided in the embodiments of the present invention. The storage medium may be a read only memory/random access memory (ROM/RAM), a magnetic disk or a compact disk-read only memory (CD-ROM).

It is apparent that those skilled in the art can make various modifications and variations to the invention without departing from the spirit and scope of the invention. The invention is intended to cover the modifications and variations provided that they fall within the protection scope defined by the claims or their equivalents.

What is claimed is:

1. A method for implementing service roaming, comprising:

receiving a roaming registration request that comprises a service identifier (ID);

obtaining a physical access address of a service according to the service ID, and generating and storing service registration route information that comprises the service ID and the physical access address of the service; and obtaining an address of a home service router or a service router to which the service belongs before the service roams, and sending a roaming notification message to the home service router or the service router to which the service belongs before the service roams, so that the home service router or the service router to which the service belongs before the service roams updates service roaming route information.

2. The method of claim 1, wherein:

the step of obtaining the address of the home service router or the service router to which the service belongs before the service roams comprises one of:

querying a service directory for the address of the home service router or the service router to which the service belongs before the service roams according to the service ID in the roaming registration request; and obtaining the address of the home service router or the service router to which the service belongs before the service roams from the roaming registration request that comprises the address of the home service router or the service router to which the service belongs before the service roams.

3. The method of claim 1, further comprising:

receiving an access request that comprises a service ID;

obtaining the physical access address of the service according to the service ID in the access request and service registration route information in the access request; and sending the access request to the service according to the physical access address of the service.

4. The method of claim 3, wherein: the roaming registration request further comprises a service access state, and the method comprises storing the service access state; before sending the access request to the service, the method further comprises:

obtaining the stored service access state; and determining that the service access state is a running state.

5. The method of claim 4, wherein one of the service registration route information and the service access state is stored on a service router to which the service belongs after the service roams, or a service registration server to which the service belongs after the service roams, or in a service directory.

6. A method for implementing service roaming, comprising:

receiving a roaming notification message from a service router to which a service belongs after the service roams, wherein the roaming notification message comprises a service identifier (ID) and an address of the service router to which the service belongs after the service roams; and updating service roaming route information according to the roaming notification message, wherein the updated service roaming route information comprises the service ID and the address of the service router to which the service belongs after the service roams.

7. The method of claim 6, further comprising:

receiving an access request that comprises a service ID; and obtaining the address of the service router to which the service belongs after the service roams according to the service ID in the access request and the service roaming route information, and sending the access request to the service router after the service roams.

8. The method of claim 6, wherein the service roaming route information is stored on one of a service router to which the service belongs before the service roams, a home service router, a service registration server to which the service belongs before the service roams, and a home service registration server, or a service directory.

9. A service router, comprising:

a roaming registration request receiving unit, configured to receive a roaming registration request that comprises a service identifier (ID);

a service registration route information generating unit, configured to: obtain a physical access address of a service according to the service ID, and generate and store service registration route information that comprises the service ID and the physical access address of the service; and a roaming notification message sending unit, configured to: obtain an address of a home service router or a service router to which the service belongs before the service roams, send a roaming notification message to the home service router or the service router to which the service belongs before the service roams, so that the home service router or the service router to which the service belongs before the service roams updates service roaming route information.

10. The service router of claim 9, wherein the roaming notification message sending unit is configured to query a service directory for the address of the home service router or the service router to which the service belongs before the service roams according to the service ID in the roaming registration request.

11. The service router of claim 9, further comprising:

an access request receiving unit, configured to: receive an access request that comprises a service ID; obtain the physical access address of the service according to the service ID and the service registration route information; and send the access request to the service according to the physical access address of the service.

12. The service router of claim 9, further comprising:

a service access state obtaining unit, configured to: obtain a stored service access state, determine that the service access state is a running state, and send the access request to the service.

13. The service router of claim 9, the roaming notification message sending unit is configured to obtain the address of the home service router or the service router to which the service belongs before the service roams from the roaming registration request that comprises the address of the home service router or the service router to which the service belongs before the service roams.

14. A system for implementing service roaming, comprising a service router and an information storage server, wherein:

the service router is configured to: receive a roaming registration request that comprises a service identifier (ID); obtain a physical access address of a service according to the service ID, and generate and store service registration route information that comprises the service ID and the physical access address of the service; obtain an address of a home service router or a service router to which the service belongs before the service roams, and send a roaming notification message to the home service router or the service router to which the service belongs before the service roams, so that the home service router or the service router to which the service belongs before the service roams updates service roaming route information; and the information storage server is configured to store the service registration route information that comprises the service ID and the physical access address of the service.

* * * * *